Aug. 5, 1958

A. A. MROS 2,846,034

COMBINED GEAR REDUCTION AND CLUTCH MECHANISM

Filed Jan. 23, 1956

INVENTOR.
ALBERT AMROS
BY
W.B. Harpman
ATTORNEY

Aug. 5, 1958      A. A. MROS      2,846,034
COMBINED GEAR REDUCTION AND CLUTCH MECHANISM
Filed Jan. 23, 1956      3 Sheets-Sheet 3

INVENTOR.
ALBERT AMROS
BY
W.B.Harpman
ATTORNEY

United States Patent Office 2,846,034
Patented Aug. 5, 1958

2,846,034

COMBINED GEAR REDUCTION AND CLUTCH MECHANISM

Albert A. Mros, Ravenna, Ohio

Application January 23, 1956, Serial No. 560,521

5 Claims. (Cl. 192—.02)

This invention relates to a mechanism in which a driven shaft is revolved very slowly by an integral power source or manually, if desired, the power source including a gear reduction eccentric planetary drive.

The principal object of the invention is the provision of a simple and efficient gear reduction and clutch mechanism for selectively controlling the motion of a driven shaft to which various devices to be moved may be connected.

A further object of the invention is the provision of a gear reduction and selective clutch mechanism utilizing an eccentrically driven planetary gear and incorporating means for translating the eccentric motion of the planetary gear to an even motion.

A still further object of the invention is the provision of a gear reduction and selective clutch mechanism in which an unusually high ratio of reduction is obtained by a small difference in the movement of teeth between an internal gear and its mating external planet gear.

A still further object of the invention is the provision of a gear reduction and clutch mechanism in which an unusually high ratio of reduction is obtained by using an internal gear and a mating external planet gear and wherein tooth interference is avoided due to the formation of the gears from larger than usual gear blanks.

A still further object of the invention is the provision of a gear reduction and selective clutch mechanism in which it is possible to control the driven or output shaft so that the same may be moved from a power source or may be moved manually whether or not the power source is operating.

The gear reduction and selective clutch mechanism disclosed herein is particularly adapted for use in mechanical operations wherein a small controlled motion on the driven or output shaft is desired along with sufficient energy to move the object or objects to be moved.

In the example of the invention chosen for illustration herein the power source comprises an electric motor operating at 1800 R. P. M. with the driven or output shaft revolved thereby at 2 R. P. M. when the selective clutch is engaged. The mechanism also incorporates a cam on the control shaft which disengages the driven or output shaft either manually or automatically by fixed or adjustable stops and re-engages the driven or output shaft when released.

The clutch structure includes a latch movably positioned in guides for endwise engagement with internal mating teeth on a revolving member whereby motion of the revolving member is transmitted through the latch to the driven or output shaft.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
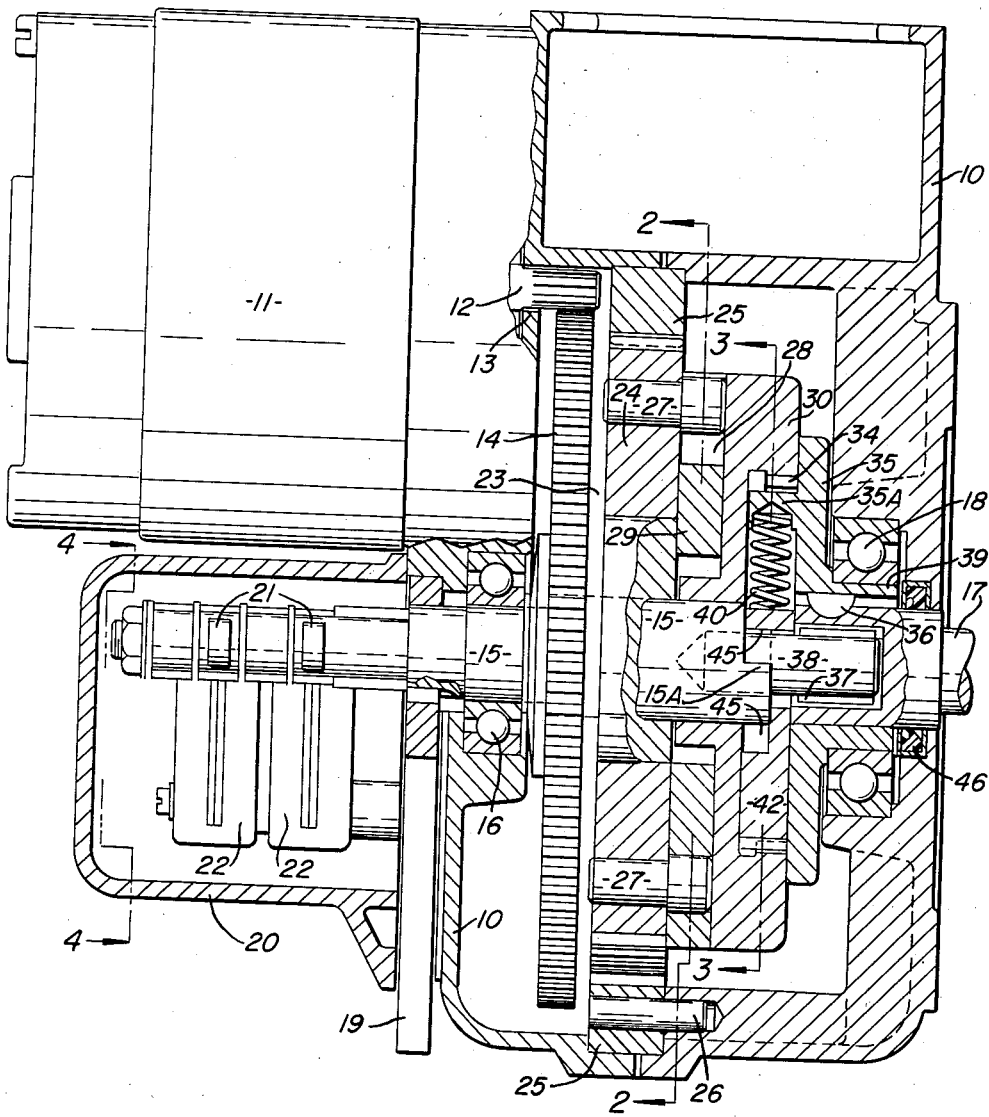
Figure 1 is a side elevation of the gear reduction and selective clutch mechanism with parts broken away and parts in cross section.

By referring to the drawings and Figure 1 in particular it will be seen that the mechanism is enclosed in a housing 10 to which an electric motor 11 is attached with the rotor shaft 12 of the electric motor extending into the housing 10 through an opening 13 and engaging the periphery of a gear 14 which is revolvably mounted on a control shaft 15. The control shaft 15 is journaled in antifriction bearings 16 in one wall of the housing 10 and is in longitudinal alignment with and in the mechanism assembly is supported by a driven or output shaft 17 which in turn is journaled in the housing 10 by antifriction bearings 18. The antifriction bearings 16 and 18 are positioned in the housing 10 around and about oppositely disposed axially aligned openings through which the control shaft 15 and output shaft 17 extend.

The control shaft 15 has an arm 19 keyed thereto which extends at right angles therefrom and by means of which the control shaft 15 may be revolved manually. A secondary housing 20 secured to the housing 10 and incorporating a transversely extending passageway through which the arm 19 passes encloses the outer end of the control shaft 15 which incorporates control cams 21. Limit switches 22—22 in the secondary housing 20 are adapted to be engaged and actuated by the cams 21 whereby automatic control of the motor 11 may be achieved.

The gear 14 has a sidewardly extending circular member 23 eccentrically located thereon with respect to the control shaft 15. The circular member 23 is rotatably engaged in the planet gear 24 which is engaged at one point on its periphery in a ring gear 25 which is fixed to the inner wall of the housing 10, as best shown in Figure 2 of the drawings, and secured against rotation by a pin 26.

Figure 2:
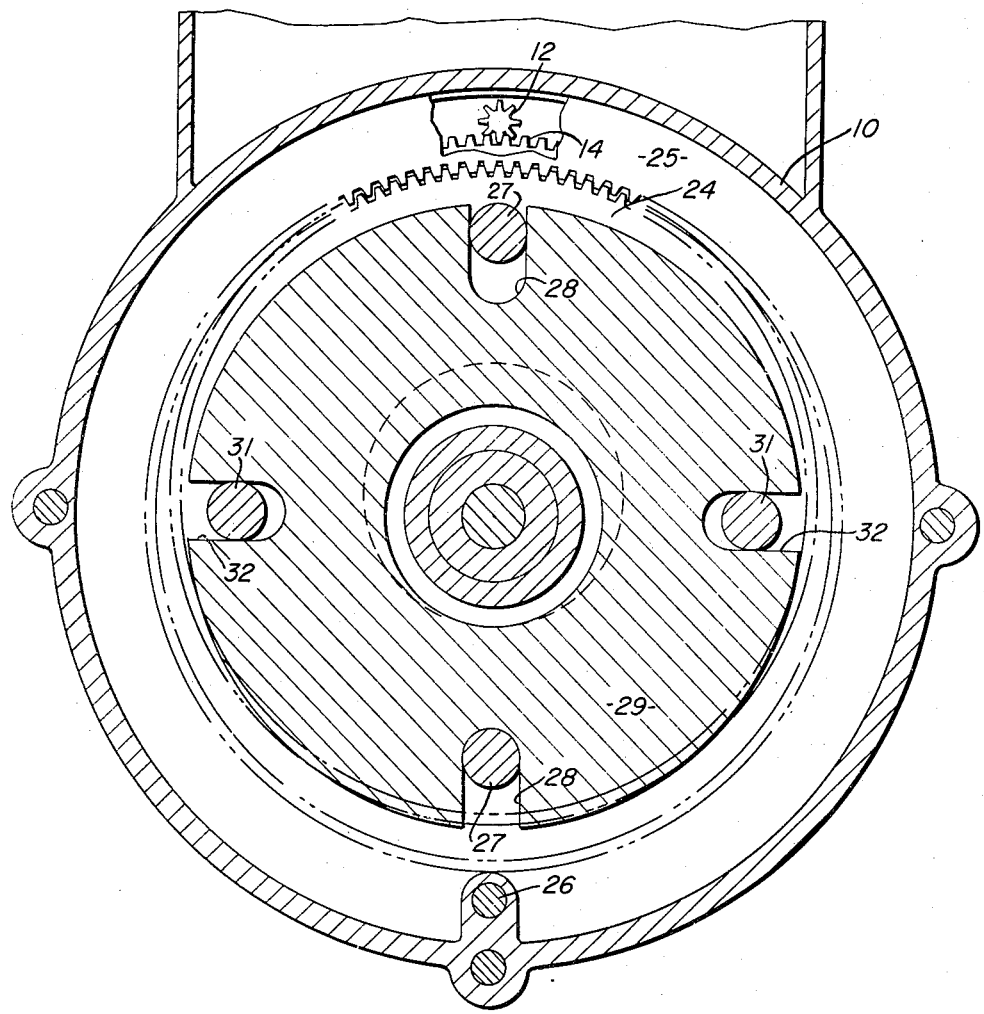
Figure 2 is a vertical section taken on line 2—2 of Figure 1.

The planet gear 24 has a pair of pins 27 positioned therein and extending sidewardly therefrom, the projecting ends of which are engaged in a pair of radially positioned slots 28—28 formed in a coupling plate 29, as best shown in Figure 2 of the drawings.

A clutch gear 30 is rotatably mounted on the control shaft 15 and has a pair of secondary pins 31—31 extending sidewardly therefrom and engaged in a pair of radially positioned slots 32—32 also formed in the coupling plate 29 and in circumferentially spaced relation to the slots 28—28 in which the pins 27—27 register.

Figure 3:
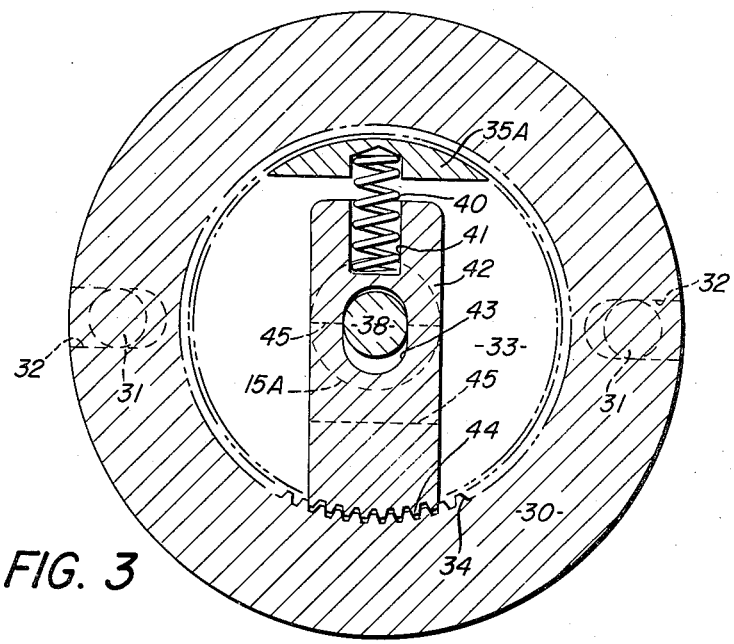
Figure 3 is a vertical section taken on line 3—3 of Figure 1.

It will thus be seen that rotating motion imparted by the rotor shaft 12 to the gear 14 revolves the circular eccentric 23 which in turn revolves the planet gear 24 for peripheral engagement at one point thereon with the ring gear 25. The resulting reversed reduced motion is conveyed by the pins 27—27 to the coupling plate 29 and by the pins 31—31 from the coupling plate 29 to the clutch gear 30 which, being journaled upon the control shaft 15, revolves in an even motion. The clutch gear 30 has a circular recess 33 formed in one face thereof and on the opposite side thereof with respect to the side lying against the coupling plate 29 and an internal gear 34 is formed therein, as best seen in Figures 1 and 3 of the drawings.

A clutch latch guide 35 is positioned adjacent the clutch gear 30 and is keyed as by a key 36 to the output shaft 17 which comprises in location an end extension of the control shaft 15, the inner end of the output shaft 17 being rotatably mounted by means of a bearing 37 on a dowel 38 and the other end of which is preset in the adjacent end of the control shaft 15.

It will be observed that a sleeve-like extension 39 of the clutch latch guide 35 is disposed between the output shaft 17 and the antifriction bearing 18 heretofore referred to. The opposite face of the clutch latch guide 35 has a sidewardly extending projection 35A which underlies the internal gear pattern 34 in the clutch gear 30.

A socket formed in the extension 35A cages a coil spring 40, the opposite end of which is engaged in a slot 41 in a clutch drive latch 42 which is slotted as at 43 intermediate its ends where it passes over the dowel 38. The opposite end of the clutch drive latch 42 is provided with gear teeth 44 matching the internal gear 34 of the clutch gear 30 heretofore referred to.

The clutch drive latch 42 has a transverse section thereof intermediate its ends cut away approximately half the thickness thereof as indicated by the transverse dotted lines 45—45 in Figure 3 of the drawings and as shown in solid lines in Figure 1 of the drawings and in which cut away area the projecting lower half-circular end of the end 15A of the control shaft 15 registers, as shown by the circular dotted lines 15A in Figure 3 of the drawings and in solid lines in Figure 1 of the drawings, so that rotating motion imparted to the control shaft 15 as by the arm 19 will cause the half-circular projecting end 15A to move the clutch drive latch 42 longitudinally against the spring 40 and thereby disengage the gear teeth 44 on the opposite end thereof from its normal spring biased engagement with the gear 34 in the clutch gear 30.

It will thus be seen that motion of the clutch gear 30 is transmitted by the clutch drive latch 42 to the clutch latch guide 35 and through the key 36 to the output shaft 17 and that at such time as the arm 19 is moved to partially rotate the control shaft 15, the end extension 15A which comprises an actuating cam for the clutch drive latch 42 will disengage the gear teeth 44 on the end thereof from the gear 34 and thereby disconnect the power source from the output shaft 17 while continued motion of the control shaft 15 as from the manual actuation of the arm 19 will partially rotate the output shaft 17.

In order that the complete gear reduction and selective clutch mechanism just described may be lubricated, the housing is adapted to be filled with lubricant and appropriate seals are provided to prevent the escape of the lubricant about the output shaft 17 and the control shaft 15, one of which is illustrated in cross sectional detail in Figure 1 of the drawings and indicated by the numeral 46.

Figure 4:
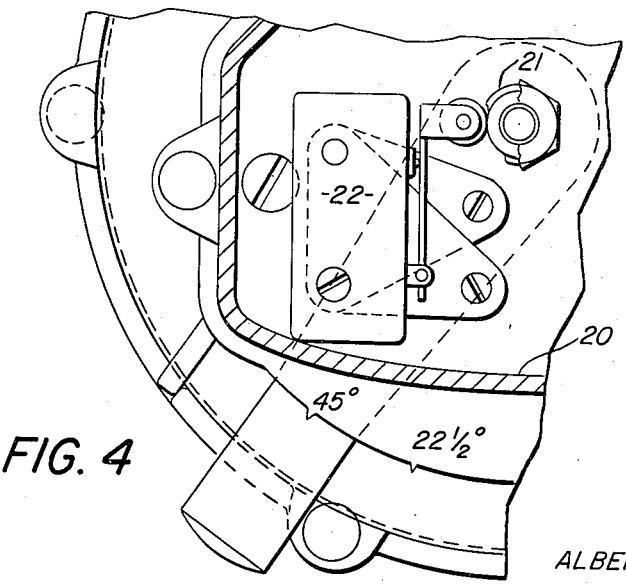
Figure 4 is a vertical section taken on line 4—4 of Figure 1.

By referring to Figures 1 and 4 of the drawings it will be observed that a controlled partial rotation of the output shaft 17 may be selected by setting the arm 19 at one of a plurality of locations indicated on the secondary housing 20 and whereby predetermined partial rotation of the control shaft 15A is accomplished. The cams 21 on the control shaft 15A serve to actuate the limit switches 22 which control the electric motor 11 by electrical circuits (not shown) so that the energization of the motor 11 will result in the slow rotation of the clutch latch guide 30 and which motion will be applied to the output shaft 17 until such time as the projecting end 15A of the control shaft 15 (in its adjusted location) engages the clutch drive latch 42 and disengages it. This action may simultaneously actuate the limit switches 22 to deenergize the motor 11.

It will thus be seen that the several objects of the invention have been met by the combined gear reduction and clutch mechanism disclosed herein.

Having thus described my invention, what I claim is:

1. A clutch mechanism including a control shaft, a clutch gear rotatably disposed on said control shaft, said control shaft having an extension of relatively smaller diameter disposed lengthwise thereof and an output shaft telescopically mounted thereon and extending therebeyond, a clutch latch guide keyed to said output shaft and a latch movably disposed in said clutch latch guide for selective engagement with said clutch gear, a cam formed on said control shaft engaging said latch for moving the same relative to said clutch gear and clutch latch guide.

2. The clutch mechanism set forth in claim 1 and wherein an arm is secured to said control shaft for imparting rotating motion thereto to actuate said cam and said latch.

3. The clutch mechanism as set forth in claim 1 wherein an annular gear is formed in said clutch gear and defines an annular recess therein and wherein said latch is positioned within said annular recess and movable in said clutch latch guide and includes gear teeth on one end engageable with said gear in said clutch gear.

4. The clutch mechanism as set forth in claim 1 wherein said latch is spring urged into engagement with said clutch gear and movable out of said engagement by said cam on said control shaft.

5. The clutch mechanism as set forth in claim 1 wherein an electric motor is employed for rotating said gear and wherein secondary cams are formed on said control shaft and limit switches are disposed adjacent said secondary cams for controlling electrical circuits energizing said electric motor and wherein means is provided for manually moving said control shaft.

References Cited in the file of this patent

UNITED STATES PATENTS

| | | |
|---|---|---|
| 506,166 | Eades | Oct. 3, 1893 |
| 757,381 | Wright | Apr. 12, 1904 |
| 1,158,457 | Dey | Nov. 2, 1915 |
| 2,029,821 | Hathaway et al. | Feb. 4, 1936 |
| 2,547,475 | Larsen | Apr. 3, 1951 |
| 2,761,331 | Buescher | Sept. 4, 1956 |